(12) United States Patent
Vulkan et al.

(10) Patent No.: US 8,950,382 B2
(45) Date of Patent: Feb. 10, 2015

(54) VEHICLE FUEL SYSTEM AND COMPONENTS THEREOF

(75) Inventors: Omer Vulkan, D N. Halutza (IL); Vladimir Olshanetsky, Beer Sheva (IL); Alon Levy, Beer-Sheva (IL)

(73) Assignee: Raval A.C.S. Ltd., D.N. Halutza (IL)

( * ) Notice: Subject to any disclaimer, the term of this patent is extended or adjusted under 35 U.S.C. 154(b) by 909 days.

(21) Appl. No.: 12/628,488

(22) Filed: Dec. 1, 2009

(65) Prior Publication Data

US 2010/0139625 A1 Jun. 10, 2010

Related U.S. Application Data

(63) Continuation-in-part of application No. 11/792,721, filed as application No. PCT/IL2005/001317 on Dec. 7, 2005, now Pat. No. 8,176,935.

(30) Foreign Application Priority Data

Dec. 16, 2004 (IL) .......................................... 165845

(51) Int. Cl.
 *F02M 25/08* (2006.01)
 *F16K 17/26* (2006.01)
 (Continued)

(52) U.S. Cl.
 CPC ...... *F02M 25/0836* (2013.01); *B60K 15/03519* (2013.01); *F02M 25/0872* (2013.01);
 (Continued)

(58) Field of Classification Search
 CPC .............. B60K 2015/03509; B60K 15/03519; B60K 2015/03514; B60K 2015/03447; B60K 2015/03585; F02M 25/0872; F16K 24/00

USPC .......................... 123/520, 516, 518, 519, 698; 137/493–493.9
See application file for complete search history.

(56) References Cited

U.S. PATENT DOCUMENTS 2,782,777 A 2/1957 Jasper
2,821,429 A 1/1958 Rantala
(Continued)

FOREIGN PATENT DOCUMENTS

CN 102562389 A 7/2012
EP 1 488 947 A2 12/2004
(Continued)

OTHER PUBLICATIONS

International Search Report for corresponding PCT International Application No. PCT/IL2010/000994; search completed on Jul. 25, 2011; search mailed on Aug. 8, 2011; three pages.
(Continued)

*Primary Examiner* — Mahmoud Gimie
*Assistant Examiner* — David Hamaoui
(74) *Attorney, Agent, or Firm* — Vorys, Sater, Seymour and Pease LLP; Susanne M. Hopkins; William L. Klima

(57) ABSTRACT

A fuel vapor control valve comprising a housing. The housing comprising inlet and outlet ports in flow communication via first and second valve controlled passages. The first valve controlled passage being configured to admit fuel vapor flow in a direction from the inlet port to the outlet port only when pressure at the inlet port exceeds a predetermined threshold. The second valve controlled passage being configured to admit vapor flow in a direction from the outlet port to the inlet port only when pressure at the inlet port drops below pressure at the outlet port. The fuel vapor control valve further comprising a sealing arrangement disposed at an external portion of the housing between the inlet and outlet ports.

15 Claims, 12 Drawing Sheets

(51) Int. Cl.
*F16K 24/00* (2006.01)
*B60K 15/035* (2006.01)
*F16K 17/196* (2006.01)
*B60K 15/03* (2006.01)

(52) U.S. Cl.
CPC ............... *F16K17/196* (2013.01); *F16K 24/00* (2013.01); *B60K 2015/03447* (2013.01); *B60K 2015/03509* (2013.01); *B60K 2015/03585* (2013.01)
USPC ........................... 123/520; 123/516; 137/493

(56) References Cited

U.S. PATENT DOCUMENTS

| | | | |
|---|---|---|---|
| 3,616,783 A | | 11/1971 | La Masters |
| 4,337,873 A | * | 7/1982 | Johnson .................. 220/203.02 |
| 5,497,800 A | * | 3/1996 | Ohashi et al. .................. 137/110 |
| 5,579,742 A | * | 12/1996 | Yamazaki et al. ............. 123/520 |
| 5,666,989 A | * | 9/1997 | Roetker ............................ 137/43 |
| 5,680,848 A | * | 10/1997 | Katoh et al. .................. 123/518 |
| 5,855,198 A | | 1/1999 | Nakajima et al. |
| 6,003,499 A | | 12/1999 | Devall et al. |
| 6,354,280 B1 | * | 3/2002 | Itakura et al. ................. 123/519 |
| 6,364,145 B1 | | 4/2002 | Shaw et al. |
| 6,415,772 B1 | * | 7/2002 | Yoshioka et al. .............. 123/518 |
| 6,561,485 B1 | * | 5/2003 | Moses et al. .................. 251/331 |
| 6,708,713 B1 | * | 3/2004 | Gericke ............................ 137/43 |
| 6,786,227 B2 | * | 9/2004 | Weldon et al. .................. 137/14 |
| 6,918,405 B2 | * | 7/2005 | Leonhardt ...................... 137/202 |
| 6,966,330 B2 | * | 11/2005 | Frohwein ...................... 137/202 |
| 7,047,997 B2 | * | 5/2006 | Beyer et al. .................... 137/202 |
| 7,509,949 B2 | * | 3/2009 | Muto et al. .................... 123/519 |
| 8,176,935 B2 | * | 5/2012 | Ehrman et al. ............. 137/493.7 |
| 8,286,658 B2 | * | 10/2012 | Devall ............................. 137/39 |
| 2002/0088494 A1 | | 7/2002 | Weldon et al. |
| 2002/0121300 A1 | | 9/2002 | Ehrman et al. |
| 2002/0157717 A1 | | 10/2002 | Hong |
| 2003/0136444 A1 | | 7/2003 | Ehrman et al. |
| 2004/0194831 A1 | * | 10/2004 | Balsdon ........................ 137/587 |
| 2012/0160218 A1 | | 6/2012 | Hagen |

FOREIGN PATENT DOCUMENTS

| | | |
|---|---|---|
| IL | 128937 A | 9/2002 |
| WO | 02/08597 A1 | 1/2002 |
| WO | 2006/064493 A1 | 6/2006 |

OTHER PUBLICATIONS

Israeli Office Action issued in IL Application 128937, Oct. 22, 2007.
Chinese Office Action; seven pages; issued Jul. 2, 2014.

\* cited by examiner

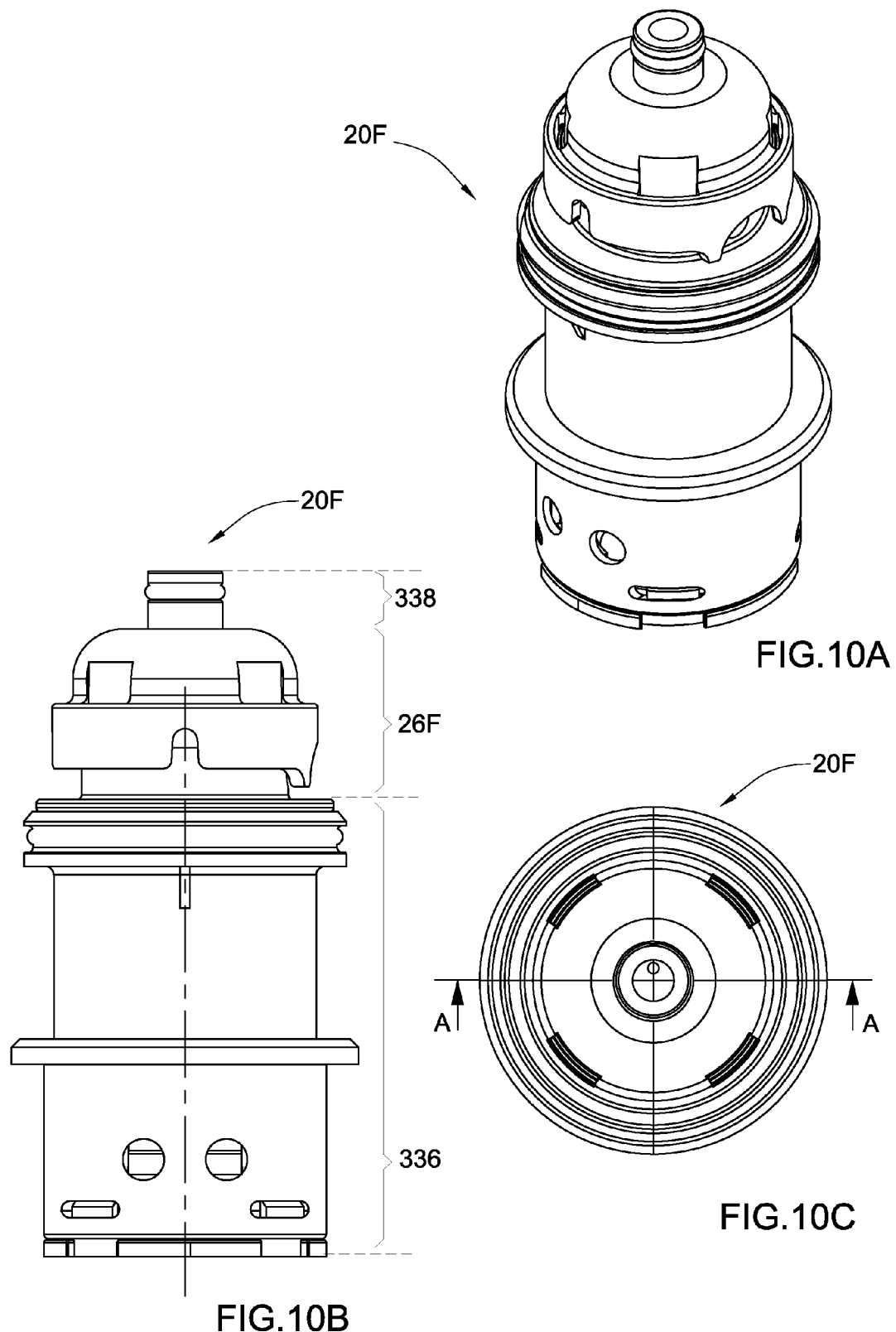

VEHICLE FUEL SYSTEM AND COMPONENTS THEREOF

This is a Continuation-In-Part of U.S. application Ser. No. 11/792,721, which is a National Phase of PCT/IL2005/001317, filed on Dec. 7, 2005, the contents of which are hereby incorporated by reference in their entirety.

FIELD

The subject matter herein relates to vehicle fuel systems and components thereof. Example fuel system components include fluid flow control valves such as fuel vapor recovery control valves for mounting in a vehicle associated with a fuel tank and a fuel vapor recovery device, e.g. a canister.

BACKGROUND

A fuel tank of the type typically mounted in a vehicle, is subject to varying pressure owing to several changing parameters, e.g. fuel consumption during operation of the engine (resulting in pressure decrease within the fuel tank), temperature fluctuations (temperature increase results in pressure increase within the fuel tank whilst temperature decrease results in pressure drop within the fuel tank), refueling (resulting in pressure increase within the tank), etc.

Such pressure changes within the fuel tank may have an overall effect on the engine's performance owing to unsteady fuel supply to the engine and, in some extreme cases, may result in deformation of the fuel tank and even damage thereto, e.g. in the form of cracks which may in turn cause fuel leakage.

In modern vehicles there is typically provided a vapor control system wherein the fuel vapor is transferred from the fuel tank to a recovery device such as a carbon canister, as known per se. For that purpose, it is also known to provide a control pressure valve being in flow communication between the fuel tank and the vapor recovery device for selectively evacuating fuel vapor from the fuel tank on the one hand, and on the other hand, to allow air flow into the fuel tank. However, it is desired not to evacuate unnecessary fuel vapors from the fuel tank so as to prevent fuel droplets from flowing towards the vapor recovery system and in order to reduce fuel consumption.

Some vapor control valves are pressure responsive whereby they open or close responsive to pressure condition at the filling pipe inlet. Other pressure responsive valves respond to vapor pressure within the fuel tank itself. Still another type of fuel vapor control valves respond to the fuel level within the fuel tank.

Fuel vapor developing within the fuel tank is collected and transferred to the vapor recovery device (i.e. a carbon canister) in which air supplied to the engine is enriched by the fuel vapor for enriching the gas mixture injected to the engine on the one hand and, on the other hand, reducing or eliminating fuel vapor escaping to the atmosphere, as this is becoming an ever-growing environmental requirement and which within a few years will become a compulsory requirement by environment control authorities.

However, in order to reduce the evacuation of fuel vapor from the tank (often carrying with it also fuel droplets) and thus reducing overall fuel consumption, it is required that evacuation of fuel vapor to the carbon canister shall take place only upon increase of fuel vapor pressure within the fuel tank over a predetermined pressure threshold.

Among the prior art disclosed in this matter there is WO0208597A1 to Raval, directed to a fuel vapor pressure control valve comprising a housing fitted with a first port connectable to a fuel tank and a second port connectable to a fuel vapor recovery device, a valve assembly for admitting vapor flow in a first direction from said first port to said second port when pressure within the tank rises to a first threshold, or for admitting vapor flow in a second, opposite direction when pressure within the tank drops below the pressure at the fuel vapor recovery device.

U.S. Pat. No. 3,616,783 to Borg-Warner Corp. Discloses a multifunction valve for controlling vapor from a fuel tank, design to open at a first pressure permitting vapor flow towards a vapor collecting apparatus and remains open until the pressure has dropped to a second lower pressure, with a check valve provided to compensate for negative pressure or lowering of fuel level, and a safety relief valve is provided to protect the tank and system from excessive pressure.

U.S. Pat. No. 6,003,499 Stant Manufacturing Inc. discloses an apparatus is provided for controlling venting of vapor to and from a fuel tank. The apparatus includes a housing and first and second valves positioned in the housing. The first valve controls the primary flow of vapors from the fuel tank and includes an aperture permitting an auxiliary flow of vapor to and from the fuel tank. The second valve controls the auxiliary flow of vapor to the fuel tank and includes first and second apertures permitting vapor to flow to the fuel tank. The second valve moves between a first position permitting vapor to flow through the first aperture and a second position permitting vapor to flow through the first and second apertures at a greater flow rate.

SUMMARY

According to a first aspect of the subject matter herein there is provided a fuel vapor control valve comprising a housing, the housing comprising inlet and outlet ports in flow communication via first and second valve controlled passages; the first valve controlled passage being configured to admit fuel vapor flow in a direction from the inlet port to the outlet port only when pressure at the inlet port exceeds a predetermined threshold; the second valve controlled passage being configured to admit vapor flow in a direction from the outlet port to the inlet port only when pressure at the inlet port drops below pressure at the outlet port; the fuel vapor control valve further comprising a sealing arrangement disposed at an external portion of the housing between the inlet and outlet ports.

The fuel vapor control valve may be configured to have any of the following features:
- While filling the fuel tank the control valve remains closed so as to facilitate spontaneous shut-off of the fueling nozzle upon pressure within the fuel tank.
- Venting the fuel tank under the regular course of operation, so as to prevent excessive pressure rise within the fuel tank.
- Venting/airing the fuel tank upon pressure drop within the fuel tank (i.e. allowing air back-flow into the fuel tank).
- When pressure in the fuel vapor recovery device is lower than atmospheric pressure, the control valve prevents fuel vapor flow from the tank into the fuel vapor recovery device, so as to prevent under pressure within the tank.
- When pressure at the outlet port drops below pressure at the inlet port, flow is prevented in a direction from the inlet port to the outlet port.
- The first valve controlled passage and the second valve controlled passage may be configured to remain sealed when pressure at the outlet port is below pressure at the inlet port.

The fuel vapor control valve may comprise an inlet chamber associated with the inlet port. The fuel vapor control valve may comprise an outlet chamber associated with the outlet port. The fuel vapor control valve may comprise a control chamber. The control chamber may be disposed between the inlet and outlet chambers.

The fuel vapor control valve may comprise a diaphragm interposing the first valve controlled passage between an inlet chamber associated with the inlet port, and an outlet chamber associated with the outlet port. The diaphragm may be biased to sealingly bear against a perimetric support member defining the first valve controlled passage. The diaphragm may be configured to normally be biased into a closed position, thereby sealing the first valve controlled passage at a predetermined force. The diaphragm may be configured to remain in the closed position until pressure at the inlet port exceeds the predetermined threshold, thereby moving the diaphragm to an open position and allowing vapor flow through the first valve controlled passage. The inlet chamber may extend along a linear path from the inlet port to the diaphragm. The inlet chamber and the outlet chamber may both extend to a first face of the diaphragm. A second face of the diaphragm, disposed at an opposite side of the diaphragm from the first face, may reside in a control chamber aired to the atmosphere via an airing aperture. The diaphragm may have a first face configured to seal the first valve controlled passage, the first face extending along a plane parallel with the inlet port. The first face may be configured to seal the first valve controlled passage. The face may extend in a direction substantially perpendicular to the outlet port.

The housing may be formed with an airing aperture associated with the control chamber. The airing aperture may be configured for allowing flow communication between a control chamber and an area external to the housing. Such airing aperture may be in the form of a single aperture or a plurality of apertures formed in the housing. The airing aperture may allow flow communication between a chamber of the valve and the atmosphere. The airing aperture may extend in a direction parallel to the inlet port. The airing aperture may extend in a direction perpendicular to the outlet port.

The housing may substantially cylindrical. The housing may have substantially cylindrical sections of different diameter. The housing may be free of any members or elements which extend in a outward radial direction therefrom. The valve may be free of radially extending tubes. The outlet port of the valve may be an aperture formed in the housing thereof. The lack of outwardly extending radial members may allow the valve to be simply fitted within a cylindrical portion of another object. The valve may be configured to be fitted within a cylindrical portion of another object.

The fuel vapor control valve may comprise a one-way valve interposing the second valve controlled passage between an inlet chamber associated with the inlet port, and an outlet chamber associated with the outlet port. The one-way valve may be configured to normally seal the second valve controlled passage. The one-way valve may be configured allow vapor flow through the second valve controlled passage only when pressure at the inlet port drops below pressure at the outlet port. The one-way valve may enable flow only at substantially low pressure differentials.

The outlet chamber may be in the form of a tubular wall section coaxial extending within the outlet chamber, with the second valve controlled passage being one or more apertures extending through the tubular wall and communicating between the outlet chamber and the inlet chamber. A longitudinal axis of the tubular wall may extend in a direction parallel to the inlet port. A longitudinal axis of the tubular wall may extend in a direction perpendicular to the outlet port. The one-way valve may be in the form of a resilient sleeve mounted over the one or more apertures formed in the tubular wall section. The resilient sleeve may tightly bear over the one or more aperture so as to normally seal the second valve controlled passage, and whereupon the sleeve deforms into opening the second valve controlled passage upon a predetermined pressure differential between the outlet chamber and the inlet chamber. The outlet chamber may have a first sub-chamber within a tubular wall section and a second sub-chamber of greater volume than the first sub-chamber. The outlet chamber may have a first sub-chamber within a tubular wall section and a second sub-chamber, and the second valve controlled passage may be one or more apertures extending through a wall of the second sub-chamber and communicating between the second sub-chamber of the outlet chamber and the inlet chamber. The second valve controlled passage may extend in a direction perpendicular to the inlet port. The second valve controlled passage may extend in a direction parallel to the outlet port.

The second valve controlled passage may be in the form of an aperture extending between outlet chamber and the inlet chamber with a sealing member extending within the inlet chamber and being deformable or displaceable so as to disengage from sealing engagement with the aperture at the event of vacuum within the inlet chamber. The sealing member, may be a leaf-like member pivotally fixed at one end thereof to the housing and being loose at its other end.

The sealing member may be received within a protective receptacle or extend behind a protective shield, to prevent collapsing thereof. The sealing member may be a mushroom-type valve.

For the purposes of the specification and the claims a sealing arrangement is defined as one or more elements which are configured to assist in prevention of vapor flow through an area. It will be understood that where the area is bounded by two or more components (such components may be valves, liquid fuel traps, etc.) each component may be formed with or comprise with one or more elements configured to be part of the sealing arrangement. A single component may comprise or be formed with all of the components configured for the sealing arrangement and another component may participate with the sealing arrangement in prevention of vapor flow through the area.

The sealing arrangement may be configured to assist in prevention of vapor flow through an area. The sealing arrangement may be configured for sealing engagement with the fuel vapor control valve. The sealing arrangement may be configured for sealing engagement between the housing of the fuel vapor control valve and a component external thereto, via direct contact with the component. The sealing arrangement may comprise a sealing element. The sealing element may be an O-ring or other sealing element(s) as known in the art per se. The sealing arrangement may comprise a peripheral groove formed in the housing of the fuel vapor control valve. In the latter case the sealing arrangement may further comprise a sealing element configured to be mounted in the peripheral groove. At least a portion of the sealing arrangement may be integrally formed with the housing of the fuel vapor control valve. The sealing arrangement may be configured to form a gas-tight seal with an object to which the valve is fitted.

In a case where the fuel vapor control valve comprises an airing aperture, the fuel vapor control valve may further comprise at least one additional sealing arrangement. The at least one additional sealing arrangement may be disposed at an external portion of the housing of the valve between the airing aperture and the inlet port. The at least one additional sealing arrangement may be disposed at an external portion of the housing and the valve between the airing aperture and the outlet port. The at least one sealing arrangement may have any of the features of a sealing arrangement described above.

It will be appreciated that the fuel vapor control valve may constitute a part of a fuel vehicle system. The fuel vehicle system may have any of the features described below.

According to a further aspect of the subject matter herein there is provided a vehicle fuel system comprising a liquid fuel trap, a fuel vapor control valve and a sealing arrangement disposed therebetween; the liquid fuel trap comprising a body formed with an expansion space; the fuel vapor control valve comprising a housing having inlet and outlet ports in flow communication; the inlet port of the fuel vapor control valve being in flow communication with the expansion space of the liquid fuel trap; the sealing arrangement being disposed at an external portion of the fuel vapor control valve's housing, between the inlet and outlet ports thereof; the sealing arrangement being configured to prevent flow communication through an area disposed between the liquid fuel trap's body and the fuel vapor control valve's housing.

The liquid fuel trap may comprise entry and exit ports. The liquid fuel trap may be formed with an additional port configured for airing the valve. In the latter case the additional port may be in flow communication with an airing aperture of the fuel vapor control valve. In such case the vehicle fuel system may further comprise at least one additional sealing arrangement. The at least one additional sealing arrangement can be configured to prevent flow communication through an area external to the housing of the valve and between the additional port and exit port of the liquid fuel trap. The at least one additional sealing arrangement can be configured to prevent flow communication between the airing port and outlet port of the fuel vapor control valve, along a path external to the housing of the fuel vapor control valve.

The body of the liquid fuel trap may be formed with a section having an internal cross-sectional shape corresponding to an external cross-sectional shape of the fuel vapor control valve, thereby allowing the fuel vapor control valve to be fitted within the section of the liquid fuel trap in a gas-tight manner.

The expansion space may be in flow communication with the entry port of the liquid fuel trap. The expansion space may have a greater volume than the volume of the inlet port of the fuel vapor control valve. The expansion space may have a greater volume than the inlet chamber of the fuel vapor control valve.

The fuel vapor control valve may have any of the features described above.

The sealing arrangement may have any of the features described above. The sealing arrangement may be configured to form a gas-tight seal between the valve and the liquid fuel trap.

A sealing element of the sealing arrangement may be associated with the fuel vapor control valve or the liquid fuel trap. For example:
  where the sealing element is an O-ring or other sealing element(s), such may be mounted on either the fuel vapor control valve or the liquid fuel trap;
  a peripheral groove formed in the housing of the fuel vapor control valve or in the liquid fuel trap's body.

At least a portion of the sealing arrangement may be integrally formed with the body of the liquid fuel trap.

The sealing arrangement may be configured to prevent flow communication through an area disposed between the entry and exit ports of the liquid fuel trap and external to the housing of the fuel vapor control valve. The sealing arrangement may be configured for preventing flow communication between the inlet port and outlet port of the fuel vapor control valve, along a path external thereto. The sealing arrangement may be configured for sealing engagement by engagement of opposing surfaces of the body of the liquid fuel trap and the housing of the fuel vapor control valve.

In a case where the fuel vapor control valve and liquid fuel trap respectively comprise an airing aperture and an additional port, the vehicle fuel system may further comprise at least one additional sealing arrangement. The at least one additional sealing arrangement may be configured to prevent flow communication through an area disposed between the airing aperture and exit port of the liquid fuel trap and may be disposed external to the housing of the fuel vapor control valve. The at least one additional sealing arrangement may be configured for preventing flow communication between the airing aperture and outlet port of the fuel vapor control valve, along a path external to the housing of the fuel vapor control valve. The at least one additional sealing arrangement may be configured to prevent flow communication through an area disposed between the additional and entry ports of the liquid fuel trap and external to the housing of the fuel vapor control valve. The at least one additional sealing arrangement may be configured for preventing flow communication between the airing aperture and inlet port of the fuel vapor control valve, along a path external to the fuel vapor control valve. The at least one additional sealing arrangement may have any of the features described above.

The vehicle fuel system may further comprise a fuel tank. In a case where the liquid fuel trap is formed with an entry port the fuel tank may be in flow communication therewith. The liquid fuel trap may be fully contained within the fuel tank. The liquid fuel trap may be partially contained within the fuel tank. The liquid fuel trap may be outside of the fuel tank.

The vehicle fuel system may further comprise a fuel vapor recovery device. In a case where the liquid fuel trap is formed with an exit port the fuel vapor recovery device may comprise an access port in flow communication with the exit port of the liquid fuel trap. The exit port of the liquid fuel trap and the access port of the fuel vapor recovery device may be integrally joined. In such case the exit port of the liquid fuel trap and access port of the fuel vapor recovery device may constitute a single port. Alternatively, the vehicle fuel system may further comprise a conduit via which the exit port of the liquid fuel trap and access port of the fuel vapor recovery device are connected. The conduit may be a pipe connectable to the exit port of the liquid fuel trap and access port of the fuel vapor recovery device.

In accordance with yet another aspect of the subject matter herein, there is provided a vehicle fuel system comprising a liquid fuel trap formed with an expansion space, and a valve; the valve comprising a housing formed with inlet and outlet ports in flow communication via at least one internal passage in the housing; the inlet port of the valve being in flow communication with the expansion space of the liquid fuel trap; the valve being fitted inside the liquid fuel trap in a gas-tight manner which prevents flow communication between the inlet and outlet ports of the valve along a path external to the valve.

The liquid fuel trap may have any of the features described above. The liquid fuel trap may be further formed with a section having an internal cross-sectional shape corresponding to an external cross-sectional shape of the valve, thereby facilitating the valve to be fitted within the section of the liquid fuel trap in the gas-tight manner.

The valve may have any of the features described above. The valve may be free of radially extending elements.

BRIEF DESCRIPTION OF THE DRAWINGS

In order to understand the subject matter herein and to see how it may be carried out in practice, several examples will now be described, by way of non-limiting examples only, with reference to the accompanying drawings, in which:

FIG. 3A illustrates the valve in its fully closed/sealed position;

FIG. 3B illustrates the valve with the first valve controlled passage in its open position; and FIG. 3C illustrates the valve with the second valve controlled passage in its open position;

FIG. 5A illustrates the valve in its fully closed/sealed position;

FIG. 5B illustrates the valve with the first valve controlled passage in its open position; and FIG. 5C illustrates the valve with the second valve controlled passage in its open position;

FIG. 7A illustrates the valve in its fully closed/sealed position;

FIG. 7B illustrates the valve with the first valve controlled passage in its open position;

FIG. 7C illustrates the valve with the second valve controlled passage in its open position

FIG. 10A is a side perspective view of a valve in accordance with yet another example;

FIG. 10B is a side view of the valve in FIG. 10A;

FIG. 10C is a plan view of the valve in FIGS. 10A and 10B; and

DETAILED DESCRIPTION

Figure 1:
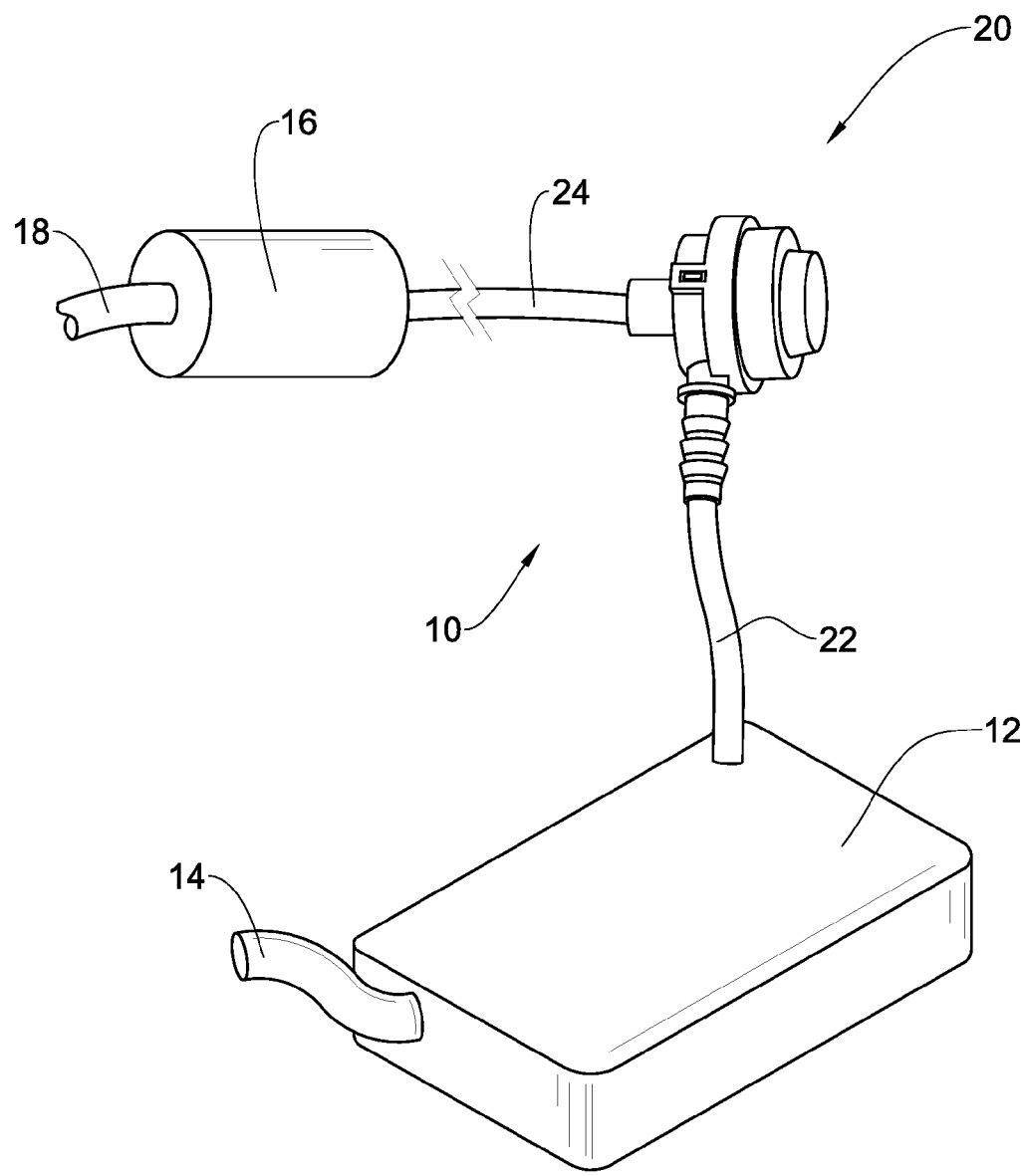
FIG. 1 is a schematic illustration of an example vehicle fuel system fitted with a fuel vapor recovery device and a fuel control valve.

FIG. 1 schematically illustrates an example vehicle fuel system generally designated 10 comprising a fuel tank 12 fitted with an inlet pipe 14 and a fuel vapor recovery device 16, typically a carbon canister. In turn, the fuel vapor recovery device 16 may be coupled to the fuel injection system of the engine (not shown) via pipe 18. Fitted intermediate tank 12 and fuel vapor recovery device 16 there is a fuel vapor control valve 20, connected to the fuel tank via pipe 22 and to the fuel vapor recovery device 16 via pipe 24. Several examples will hereinafter be discussed in detail with reference to the remaining figures. It is appreciated however, that the illustration of FIG. 1 is merely a schematic example and that an actual vehicle's fuel system comprises many more valves and other components, not shown.

A first example is disclosed with reference to FIGS. 2 and 3A to 3C illustrating a valve designated 20A comprising a housing 26A fitted with an inlet tube section 28A and an outlet tube section 30A defining an inlet port 32A and an outlet port 34A respectively. Extending within the housing 26A there is an inlet chamber 36A and an outlet chamber 38A partitioned by a tubular wall section 42 formed at its upper end with an annular valve seating 44.

A peripheral sealing wedge 52 of the diaphragm 50 is sealingly clamped between a peripheral annular groove 54 of housing 26A and a corresponding clamping portion 58 of cover 62A to thus retain the diaphragm 50 and provide sealing engagement such that a control chamber 66 extending above diaphragm 50 is not in flow communication with either the inlet chamber 36A or the outlet chamber 38A.

In accordance with a modification, the cover 62A comprises an aperture 68, illustrated in dashed lines, to air the control chamber 66 to the atmosphere.

Figure 2:
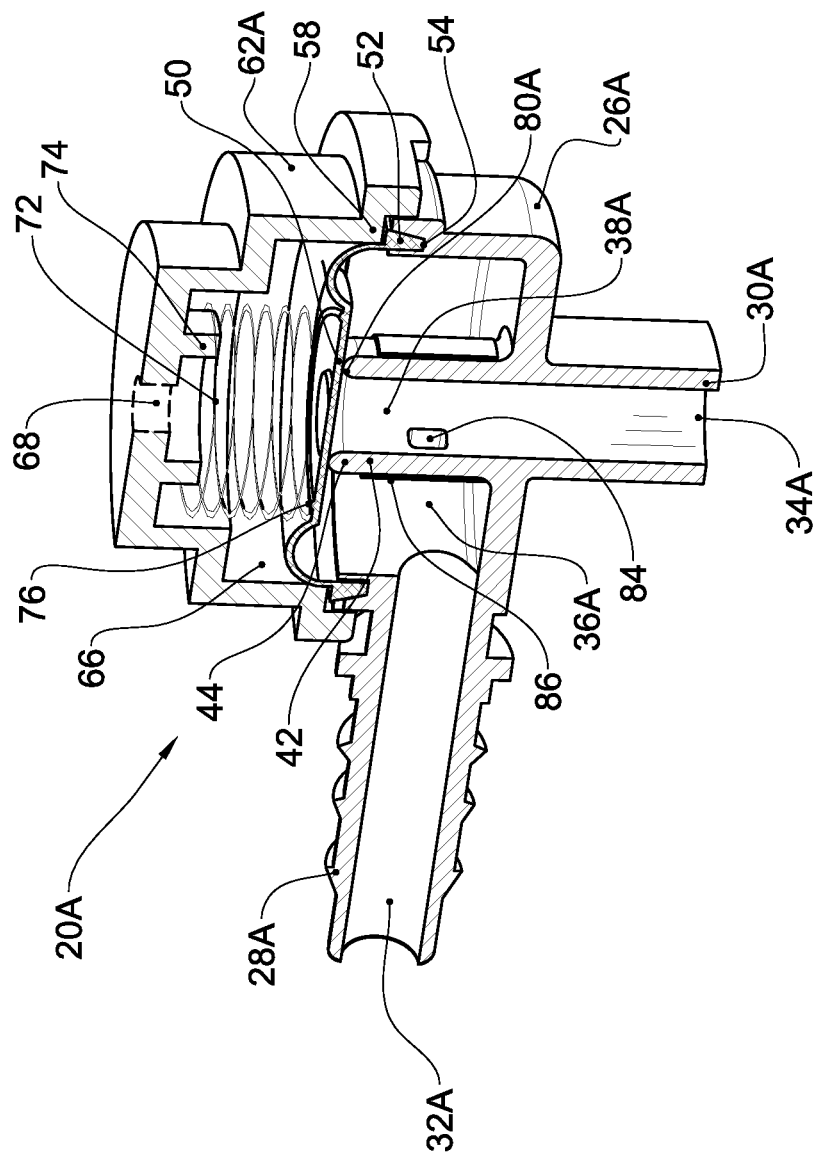
FIG. 2 is sectioned perspective view of a valve, the valve illustrated in a fully closed/sealed position.

Further noticed in FIG. 2, the diaphragm 50 is normally biased against the sealing ridge 44 by means of a coiled spring 72 bearing at one end against a portion of the cover 62A and at its opposed end against the diaphragm 50, the spring being axially retained by means of a support 74 extending from the cover 62A and a spring retaining projection 76 extending from the diaphragm 50. The cover 62A is typically snap-fitted over the housing 26A. though it may be otherwise attached, e.g. by adhering, heat or sonic welding, etc.

Extending between the inlet chamber 36A and the outlet chamber 38A there is a first valve controlled passage which is normally sealed by diaphragm 50 bearing against ridge 44 of the annular wall portion 42. A second valve controlled passage 84 extends between the inlet chamber 36A and the outlet chamber 38A and is normally sealed by a resilient sleeve member 86 which is self biased into sealing said aperture 84.

It is appreciated that the resiliency of the sleeve 86 dominates the minimum pressure required to deform the sleeve so as to open the second valve controlled passage 84. It is further appreciated that fluid flow through the second valve controlled passage 84 is possible only in the direction from the outlet chamber 38A towards the inlet chamber 36A, but not in a reverse direction.

It is further noticed that the section area ratio of the diaphragm 50 exposed to the outlet chamber 38 is substantially smaller than the section area exposed to the inlet chamber 36A (in the form of an annulus) thereby preventing the diaphragm 50 to displace into its open position upon substantially low pressurized fluid flow in the direction from the outlet chamber towards the inlet chamber but, on the other hand, will displace into the open position upon fluid flow in an opposite direction namely, from the inlet chamber 36A towards the outlet chamber 38A, upon a pressure differential which can overcome the nominal threshold of the biasing spring 72 and the elasticity of the diaphragm 50.

Figure 3A:
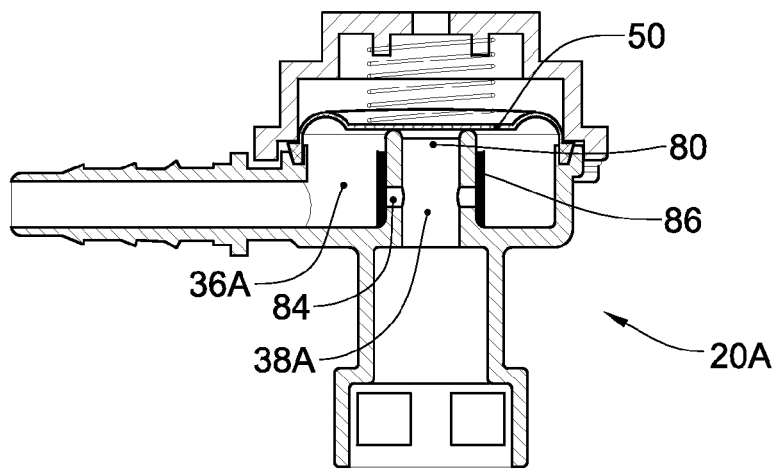
FIGS. 3A to 3C are longitudinal sectional views, illustrating the valve of FIG. 2 in different operative positions, as follows.

FIG. 3A illustrates the valve 20A in a completely sealed position namely where the first valve controlled passage 80 is sealed by diaphragm 50 and where the second controlled passage 84 is sealed by the sleeve 86. In this position there is substantially no flow between the inlet chamber 36A and the outlet chamber 38A namely no fluid flow between the fuel tank and the canister, both of which are not displayed. This position occurs at a substantially pressure equilibrium between the inlet chamber and the outlet chamber and in turn between the fuel tank and the vapor recovery device.

Figure 3B:
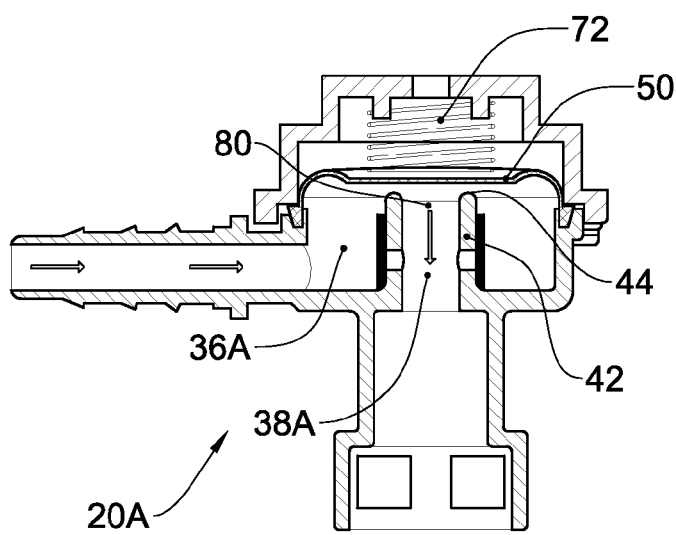

A second position is illustrated in FIG. 3B referring to a position in which pressure rises within the fuel tank the consequence of which a corresponding rise in pressure occurs at the inlet chamber 36A resulting in the formation of the diaphragm 50 so as to disengage the annular rim 44 of the tubular wall 42, thus opening the first valve controlled passage 80 enabling fluid to flow towards the outlet chamber 38A. It is appreciated that the cut-off pressure for displacing the diaphragm 50 into its open position is governed by the elasticity of the diaphragm 50 and by the biasing effect of spring 72.

Figure 3C:
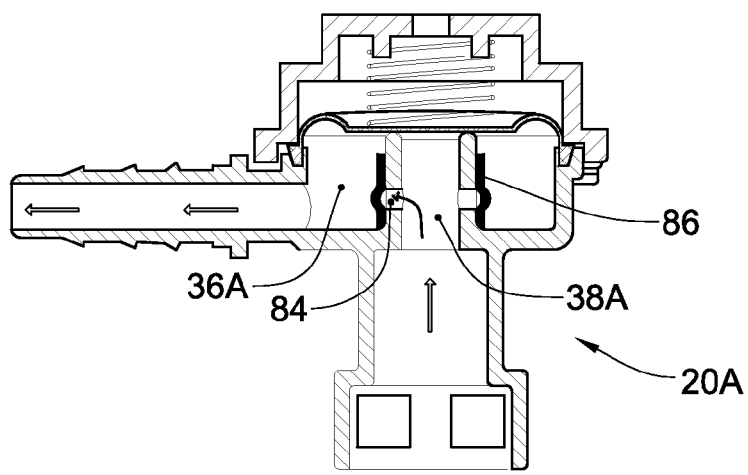

In the position of FIG. 3C, there is illustrated a position where pressure at the vapor recovery device (i.e. canister) is higher than vapor pressure within the fuel tank as a result of which the resilient sleeve 86 is deformed to thereby expose the second valve controlled passage 84 allowing fluid flow in the direction from the outlet chamber 38A towards the inlet chamber 36A and into the fuel tank (not shown).

In the modification where the top cover 62 comprises an airing aperture (68 in FIG. 2) thus the pressure threshold for displacing diaphragm 50 into its open position so as to expose the first valve controlled passage takes into account also the atmospheric pressure residing in the control chamber 66.

Figure 4:
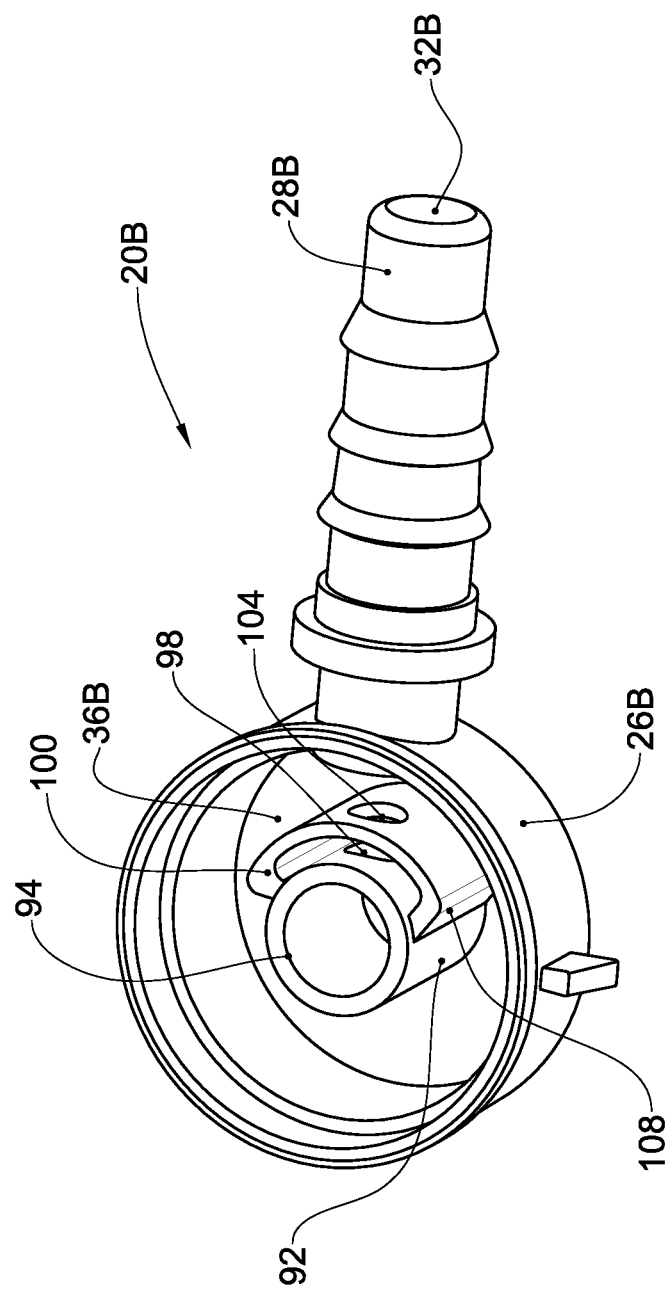
FIG. 4 is a top perspective view of only a bottom portion of a housing of a valve according to an other example.

Turning now to the example of FIG. 4 there is illustrated a housing portion 26B which is basically similar to housing 26A disclosed in connection with FIG. 2 and comprises an inlet tube 28B defining an inlet port 32B connectable to the fuel tank by suitable tubing (not shown) and extending into an annular inlet chamber 36B. A tubular wall portion 92 is formed with a ridge 94 over which extends the first valve controlled passage, below the diaphragm (see FIGS. 5A-5C) and as already explained in connection with the previous example. A second valve controlled passage in the form of an aperture 98 is formed in the wall 92 similar to the arrangement disclosed in connection with the example of FIGS. 2 and 3 with the provision of a shielding wall 100 also formed with an aperture 104 extending opposite the opening of the inlet tube 28B such that fluid flow there through has practically direct access into a space 108 formed between the shield portion 100 and the corresponding wall portion 92.

Figure 5A:
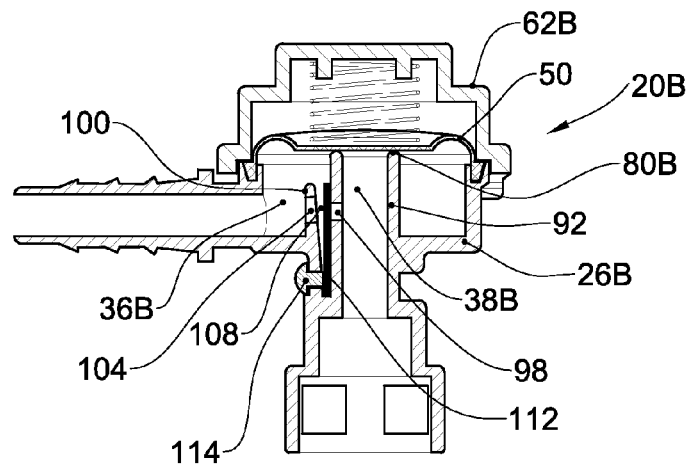
FIGS. 5A to 5C are longitudinal sectional views, illustrating the valve according to the example of FIG. 4, in different operative positions, as follows.
Figure 5B:
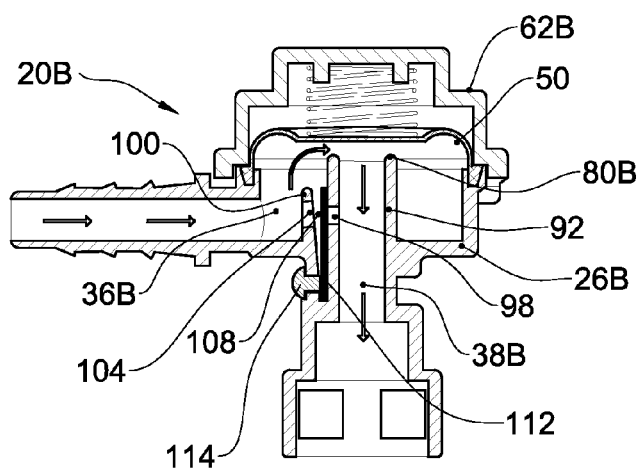
Figure 5C:
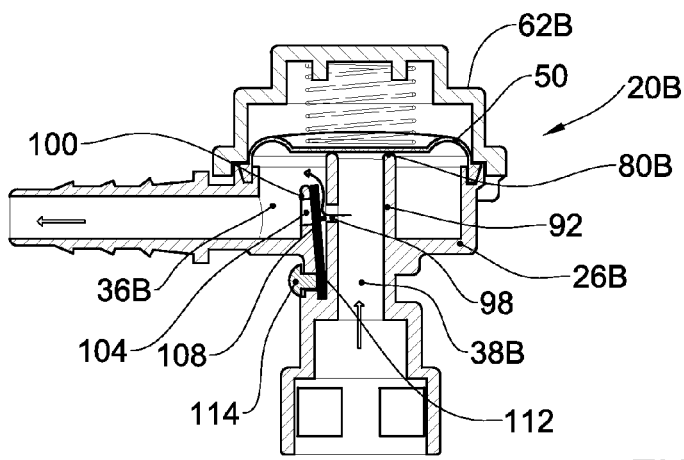
Figure 6:
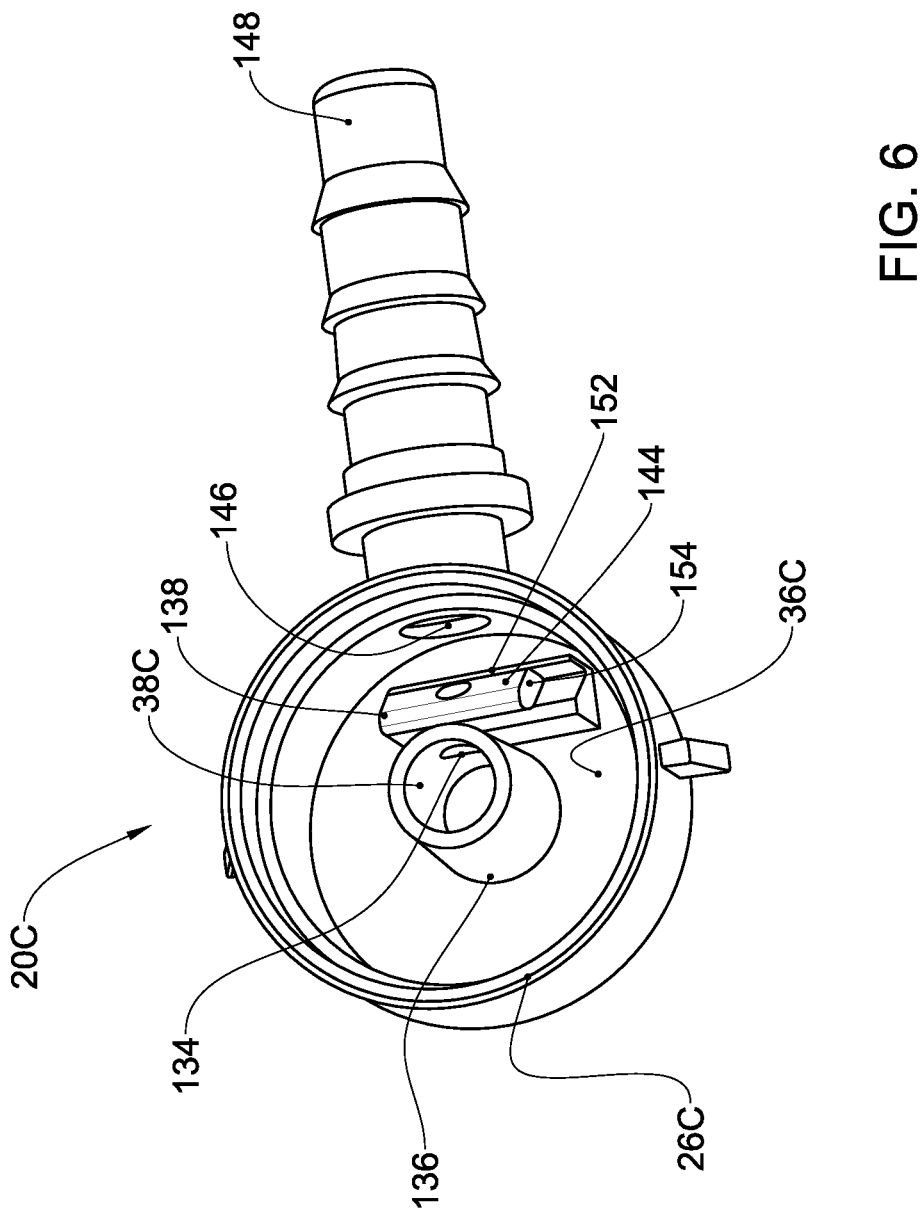
FIG. 6 is a top perspective view of only a bottom portion of a housing of a valve according to a different example.

With further reference now to FIGS. 4 and 5A to 5C one can notice that there is disposed within the space 108 a sealing member 112 in the form of a resilient leaf fixed at a bottom end thereof to the housing by means of stud 114 such that an upper portion of the seal member 112 is floppy and free to displace between a sealed position (FIGS. 5A and 5B) and an open position (FIG. 5C).

The arrangement in connection with the first valve controlled passage 80B is identical as disclosed in connection with the first example depicted in FIGS. 2 and 3 and the reader is directed to the disclosure hereinabove.

In FIG. 5A the control valve 20B is illustrated in a fully closed position namely with the first valve controlled passage 80B closed by diaphragm 50 and the second valve controlled passage 98 sealed by means of leave-like seal member 108. This position is understood to occur when the pressure at the inlet chamber 36B is lesser than the predetermined pressure threshold required for displacing the diaphragm 50 into its open position and also in a position where the pressure at the fuel tank and as a result at the inlet chamber 36B is higher than the pressure at the outlet chamber 38B.

In the position illustrated in FIG. 5B the first valve controlled passage 80B is opened to allow fluid flow from the fuel tank via the inlet chamber 36B and into the outlet chamber 38B from where it is free to flow to the fuel vapor recovery device. This position occurs upon pressure within the fuel tank namely, when a pressure build-up occurs within the fuel tank preceding the pressure threshold.

In the position of FIG. 5C the first valve controlled passage 80B is illustrated in its closed position whilst the second valve controlled passage 98 is open owing to displacement of the sealing leaf-like member 112 into its open position, i.e. disengaged from the tubular wall portion and bearing against the shield 100, thus allowing vapor flow from the outlet chamber 38B towards the inlet chamber 36B. This position occurs during generation of vacuum within the fuel tank e.g. upon consumption of fuel or in extreme cold locations where the volume of the fuel and fuel vapor within the tank reduce.

It is noticed that the second valve controlled passage 98 remains closed under influence of fluid flow in the direction from the inlet port towards the outlet port owing to slight fluid pressure applied on the leaf-like sealing member 112 through the aperture 104 formed in the shield wall 100.

Figure 7A:
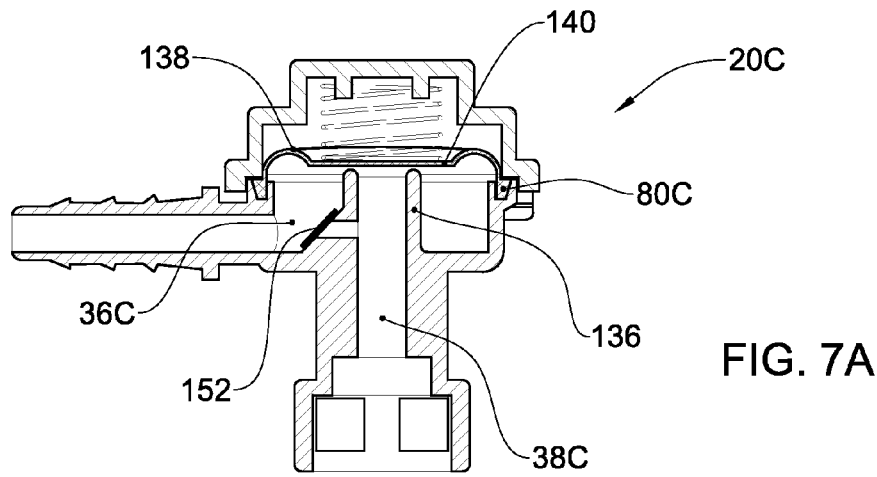
FIGS. 7A to 7C are longitudinal sectional views, illustrating the valve according to the example of FIG. 6, in different operative positions, as follows.
Figure 7B:
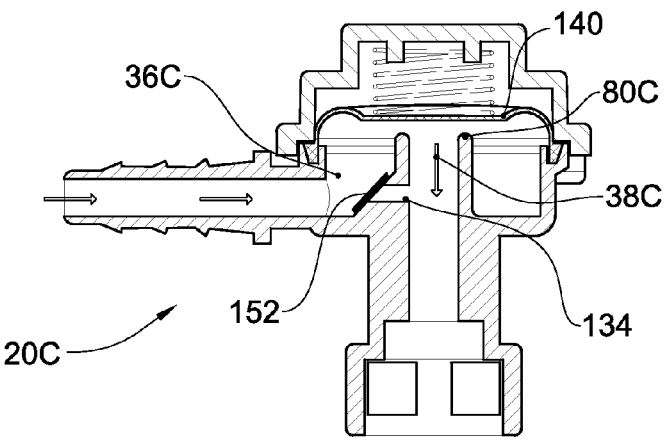
Figure 7C:
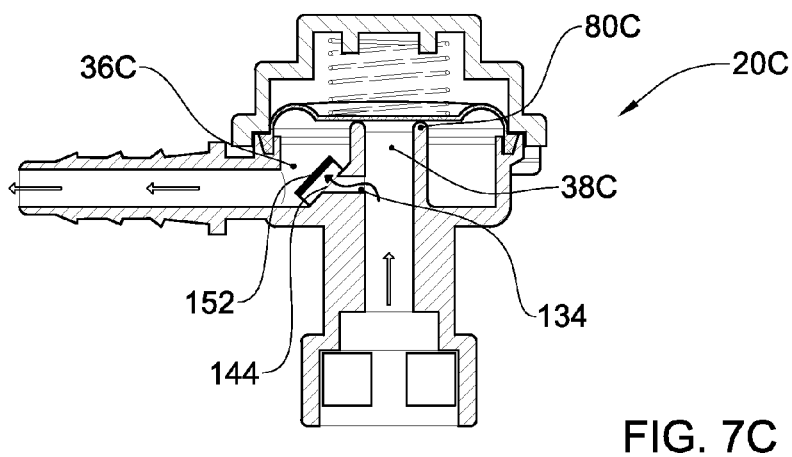

A further example is illustrated in FIGS. 6 and 7A to 7C, illustrating a control valve generally designated 20C and which up to a great extent resembles the example illustrated in connection with FIGS. 4 and 5A to 5C. The main differences residing between the present example and in the previous example resides in the configuration of the second valve controlled passage 134 formed in the annular wall portion 136 defining the outlet chamber 38C within the annular wall portion and the inlet chamber 36C outside the annular wall portion. The upper ridge 138 of the annular wall portion constitutes the seal for the diaphragm 140 (FIGS. 7A to 7C) constituting therebetween the first valve controlled passage 80C. The second valve controlled passage 134 is in the form of a channel extending between the outlet chamber 38C and the inlet chamber 36C, terminating at the inlet chamber 36C at an inclined bed support 144 facing an outlet 146 of the inlet tube 148. The second valve controlled passage is sealable by means of a leaf-like sealing member 152 secured at one end thereof 154 to the housing 26C. As can be seen in FIGS. 7A and 7B the sealing member 152 is in its sealed position sealingly bearing over the bed 144 sealing the second valve controlled passage 134 whilst in FIG. 7C the sealing member 152 disengages from the bed 144 so as to allow fluid flow in the direction from the outlet chamber 38C towards the inlet chamber 36C.

In FIG. 7A the valve 20C is illustrated in its fully closed position namely with the first valve controlled passage 80C in the sealed position whereby diaphragm 140 sealingly bears over ridge 138 and where the second valve controlled passage is sealed by means of leaf-like sealing member 152 sealingly bearing over the inclined bed 144 and sealing the second valve controlled passage 134. In the position of FIG. 7B the first valve controlled passage 80C is open by means of displacement of diaphragm 140 to disengage from the ridge 138, thereby allowing fluid flow in the direction from the inlet chamber 36C towards the outlet chamber 38C whilst the second valve controlled passage 134 remains in its sealed position.

Figure 8:
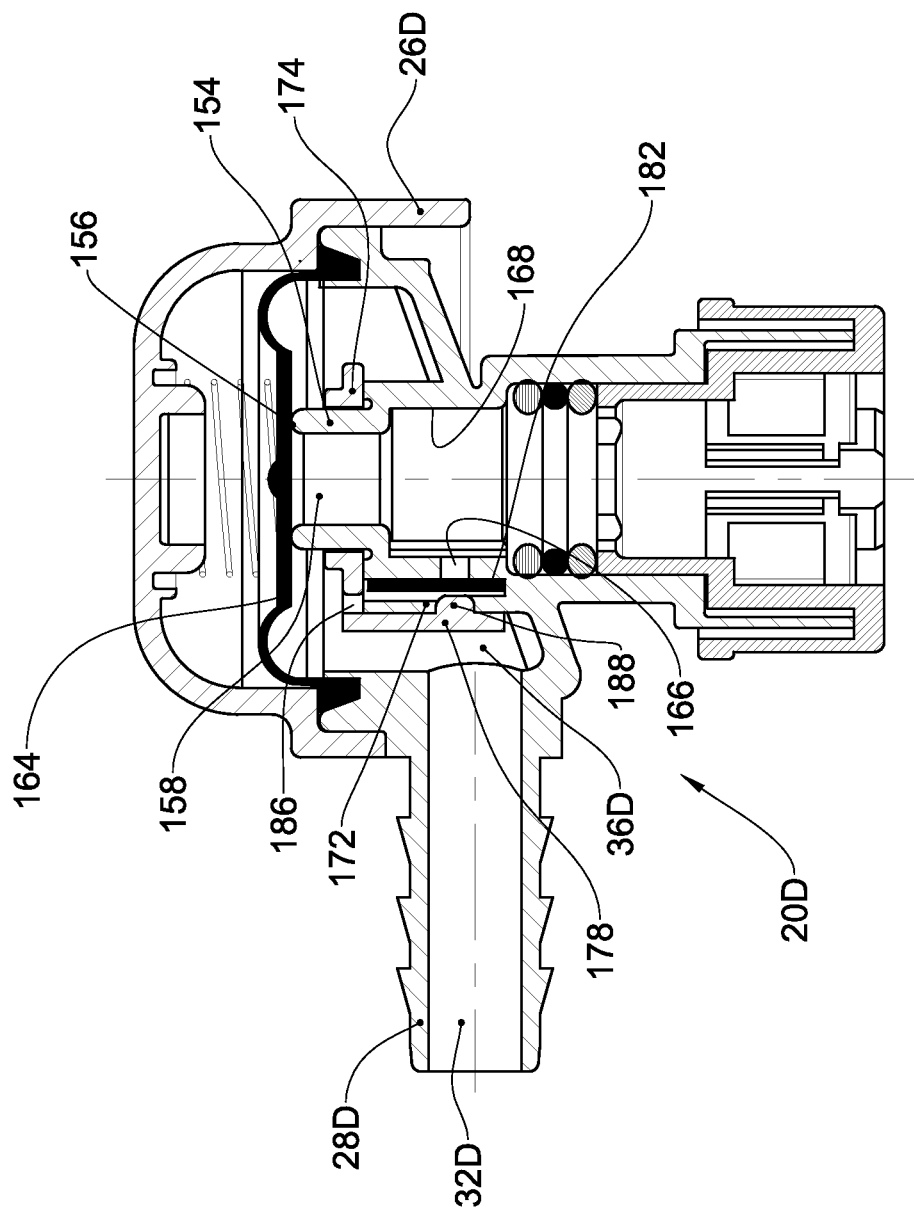
FIG. 8 is longitudinal section through valve according to a modification of the second example, the valve illustrated in a fully closed/sealed position.

In FIG. 8 there is illustrated a modification of the second example referred to hereinabove resilient sealing leaf-like member 182. The valve generally designated 20D comprises a housing portion 26D which is basically similar to housing 26A disclosed in connection with FIG. 2 and comprises an inlet tube 28D defining an inlet port 32D connectable to the fuel tank by suitable tubing (not shown) and extending into an annular inlet chamber 36D. A tubular wall portion 154 is formed with a ridge 156 over which extends the first valve controlled passage 158, below the diaphragm 164. A second valve controlled passage in the form of an aperture 166 is formed in wall 168 below the tubular wall portion 154, similar to the arrangement disclosed in connection with the example of FIGS. 2 and 3 with the provision of a shielding member 172 comprising a ring portion 174 for secure mounting over the tubular wall portion 154, and a shielding wall portion 178 extending opposite the aperture 166 and supporting a resilient sealing leaf-like member 182. The ring portion 174 is formed with an aperture 186 to allow fluid flow from aperture 166 towards the inlet chamber 36D. The shielding wall portion 174 is further formed with a protuberance 188 extending substantially opposite aperture 166, so as to support the resilient sealing leaf-like member 182 and prevent it from displacing. Operation of the valve disclosed in FIG. 8 is similar to that disclosed in connection with the previous examples, and in particular with respect to the example of FIGS. 4 and 5.

The arrangements disclosed hereinabove with reference to FIGS. 2 to 8 operate such that during filling the fuel tank (refueling) the control valve remains closed so as to facilitate spontaneous shut-off of the fuel pump upon pressure within the fuel tank. However, under the regular course of operation the fuel tank is vented so as to prevent excessive pressure rise within the fuel tank on the one hand and to prevent its bucking under vacuum at the event of substantive pressure decrease. Furthermore, whenever pressure within piping extending between the control valve and the fuel vapor recovery device is lower than atmospheric pressure, the control valve prevents fuel vapor flow from the tank, so as to prevent pressure drop within the tank.

A fuel vapor control valve may be fitted within a liquid fuel trap. Some examples of vehicle fuel systems comprising a fuel vapor control valve fitted within a liquid fuel trap are described hereinafter with reference to FIGS. 9A-10D.

In FIGS. 9A-9D there is illustrated a valve generally designated 20E, which has an similar internal construction to the valve 20D shown in FIG. 8, at least with respect to the leaf-like member 182 (FIG. 9D) and first and second valve controlled passages. Some differences of the internal construction of the valves 20D and 20E will be detailed hereinafter.

Figure 9A:
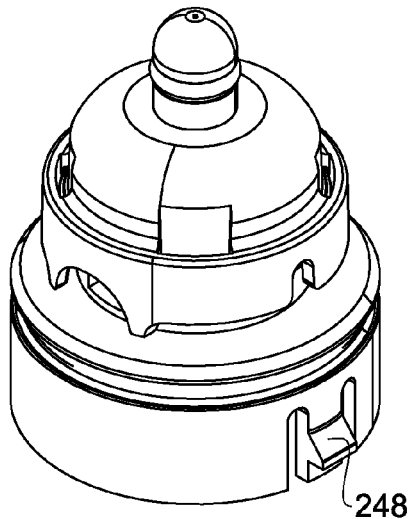
FIG. 9A is a side perspective view of a valve in accordance with another example.
Figure 9B:
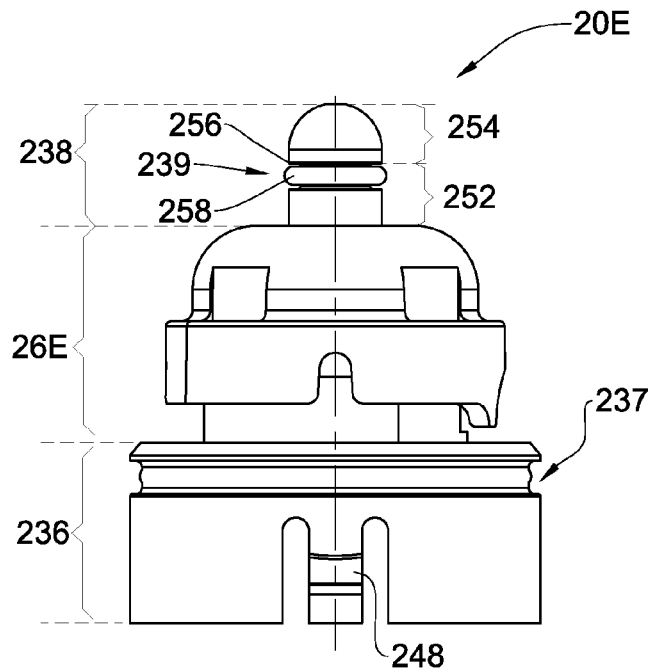
FIG. 9B is a side view of the valve in FIG. 9A.
Figure 9C:
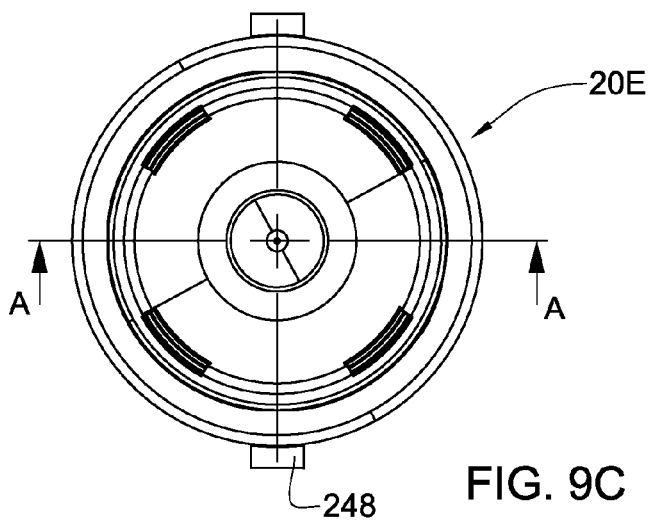
FIG. 9C is a plan view of the valve in FIGS. 9A and 9B.
Figure 9D:
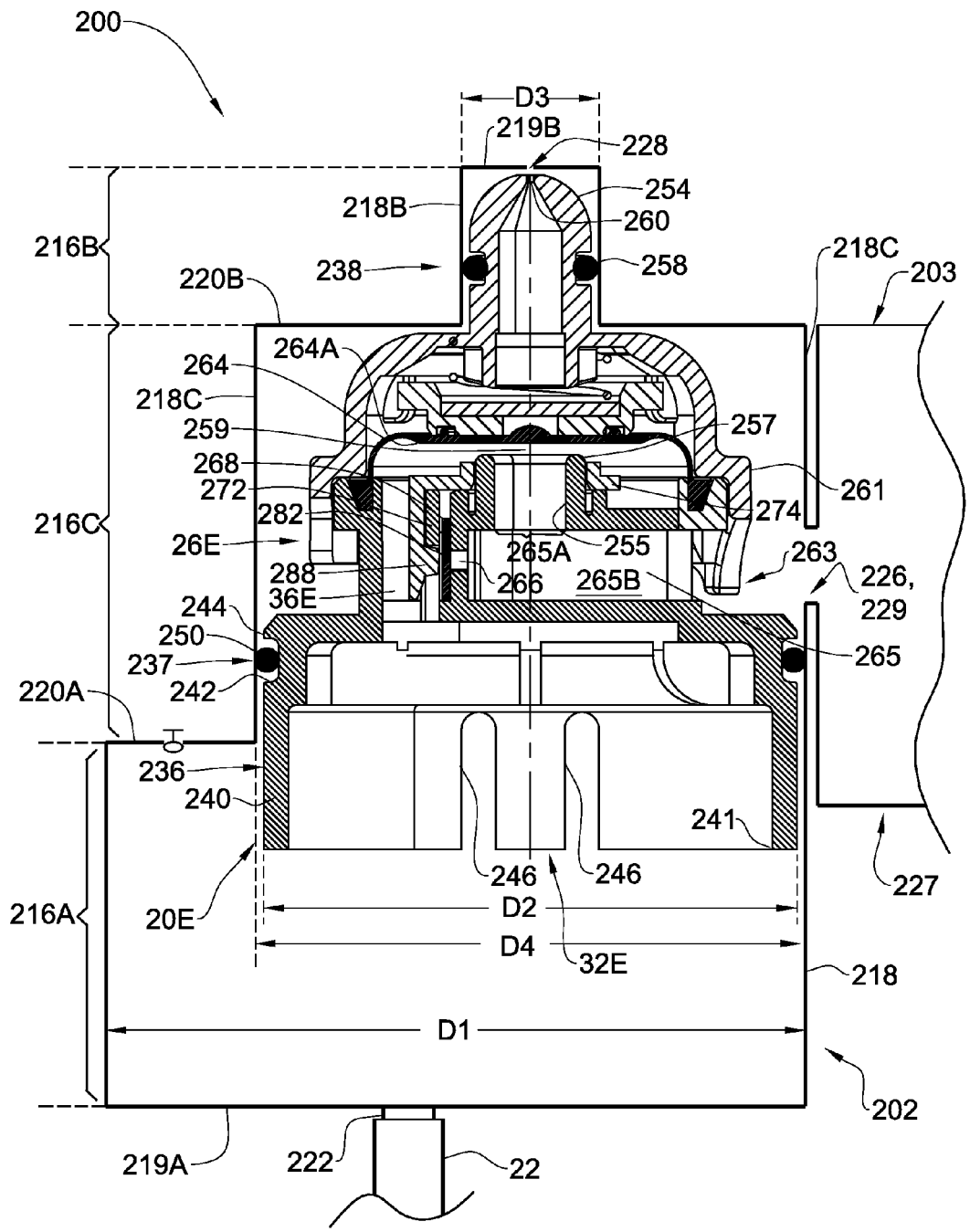
FIG. 9D is a schematic view of a liquid fuel trap with the valve in FIGS. 9A-9C, sectioned along line A-A in FIG. 9C, therein, and portions of a vapor recovery device and a pipe.

In FIG. 9D it can be seen that the valve 20E is part of a vehicle fuel system generally designated 200 which further includes a liquid fuel trap 202, a fuel vapor recovery device 203 (only partially shown) and a pipe 22 for connecting the liquid fuel trap 202 to a fuel tank 12 (not shown).

The liquid fuel trap, generally designated as 202, comprises a body 207 formed with three cylindrical sections, including a first section 216A, a second section 216B, and a third section 216C extending therebetween.

The first section 216A comprises a side wall 218A extending between a bottom wall 219A and a laterally extending wall 220A. The first section 216A also has a cross sectional diameter D1. An expansion space 217 is defined between the side wall 218A, bottom wall 219A and laterally extending wall 220A. The bottom wall 219A is formed with an entry port 222 connectable to a pipe 22, for allowing flow communication between the liquid fuel trap 202 and the fuel tank 204 (not shown). The expansion space 217 is in flow communication with the entry port 222 of the liquid fuel trap 202.

The third section 216C comprises a side wall 218C and has a cross sectional diameter D2 which is smaller than the cross sectional diameter D1 of the first section 216A. The laterally extending wall 220A extends between the side walls (218A, 218C) of the first and third sections (216A, 216C). The third section 216C is formed with an exit port 226, formed in the side wall 218C, which allows flow communication between the valve 20E and an adjacent portion 227 of the refuel vapor recovery device 203.

It should be noted that in this example, the fuel vapor recovery device 203 comprises an access port, generally designated as 229, in flow communication and integrally joined with the exit port, generally designated as 226, of the liquid fuel trap 202.

The second section 216B comprises a top wall 219B, an annular wall 220B, and a side wall 218B extending therebetween. The second section 216B also has a cross sectional diameter D3, which is smaller than the cross sectional diameter D2 of the third section 216C. The annular wall 220B extends between the side walls (218B, 218C) of the second and third sections (216B, 216C). The second section 216B is formed with an additional port 228, formed in the top wall 219B, allowing flow communication between the valve 20E and an area 210, external to the fuel tank. The area 210 in this example being at atmospheric pressure.

The annular wall 220A is formed with a fourth opening 230. The fuel vapor recovery device 202 further comprises an umbrella check valve 232 mounted on the fourth opening 230, and a dust cap 234 mounted above the umbrella check valve 232. This arrangement allows regulated flow communication between the first section 216C of the fuel vapor recovery device 202 and the area 210 external to the liquid fuel trap 202.

With reference to FIG. 9B, it can be seen that the valve 20E comprises three substantially cylindrical portions including a base housing portion 236, a top housing portion 238 and a central housing portion 26E extending therebetween. The valve 20E comprising first and second sealing arrangements (237, 239).

Reverting to FIG. 9D, the base housing portion 236 comprises an annular wall 240. The annular wall 240 has an outer diameter D4 corresponding in dimension to the cross sectional diameter D2 of the third section 216C of the liquid fuel trap 202. The annular wall 240 is formed with a peripheral groove 242 disposed near an upper edge 244 thereof, longitudinal slots 246 and a flexible snap lock member 248 (best seen in FIGS. 9A-9C) configured for connection to the fuel vapor recovery device. The base portion 236 further comprises an O-ring 250 mounted in the peripheral groove 242, both of which are disposed at an external portion of the base housing portion 236. Notably, the O-ring 250 engages and seals the side wall 218C in a gas-tight manner.

In this example the first sealing arrangement 237 is constituted by the O-ring 250 and the peripheral groove 242 of the base housing portion 236 of the valve 20E, however it will be appreciated that, alternatively, a sealing arrangement having similar elements could also be part of the liquid fuel trap 202 and not the valve 20E.

A lower edge 241 of the annular wall 240 of the base housing portion 236 defines an inlet port 32E of the valve 20E. The inlet port 32E is in flow communication with the expansion space 217. The inlet port 32E extends into an inlet chamber 36E of the valve 20E.

With reference to FIG. 9B, the top housing portion 238 comprises a cylindrical section 252 and a convexly-shaped top section 254 extending from the cylindrical section 252. The cylindrical section 252 is formed with a peripheral groove 256 having a second O-ring 258 mounted therein, both of which are disposed at an external portion of the top housing portion 238. Notably, the O-ring 258 engages and seals the side wall 218B in a gas-tight manner.

Reverting to FIG. 9D, the convexly-shaped top section 254 is formed with an airing aperture 260 configured to allow flow communication between the valve 20E and the area 210 via the liquid fuel trap 202.

The central housing portion 26E comprises an annular wall 261, a tubular wall portion 255 formed with a ridge 257 adjacent to which extends the first valve controlled passage 259, below the diaphragm 264. The annular wall 261 is formed with an outlet port 263, allowing flow communication between an outlet chamber 265 of the valve 20E, and the exit port 226 of the liquid fuel trap 202, and hence also with the access port 229 and the fuel vapor recovery device 203. Notably the outlet port 263, is an aperture. It will be appreciated that previous examples of valves included a radially extending outlet tube section (for example, the tube section designated 30A in FIG. 2), however, as illustrated, a valve having a similar function may be free of such tube section. It will be appreciated that a valve free of a radially extending tube or element may allow ease of assembly of the valve within a portion of a liquid trap (in this example the cylindrical third section 216C). It is also seen that the outlet chamber 265 can be divided into a first sub-chamber 265A and an additional sub-chamber 265B of greater volume than the first sub-chamber 265A. A second valve controlled passage in the form of an aperture 266 is formed in wall 268 below the tubular wall portion 255, similar to the arrangement disclosed in connection with the example of FIGS. 2, 3 and 8, with the provision of a shielding member 272. The second valve controlled passage 266 is configured to enable flow communication between the additional sub-chamber 265B and inlet chamber 36E, when the resilient sealing leaf-like member 282 is not in a sealing position. The shielding member 272 comprising a ring portion 274 for secure mounting over the tubular wall portion 255, and a shielding wall portion 278 extending opposite the aperture 266 and supporting a resilient sealing leaf-like member 282. The ring portion 274 is formed with an aperture (not shown) to allow flow through the aperture 266 towards the inlet chamber 36E. The shielding wall portion 274 is further formed with a protuberance 288 extending substantially opposite aperture 266, so as to support the resilient sealing leaf-like member 282 and prevent displacement thereof which would cause flow communication under conditions contrary to the desired function of the valve.

It will be appreciated that the valve 20E, not only differs from previous examples in that it is free of a radially extending tube, i.e. it is substantially cylindrical, but also that the internal components thereof are configured in a different orientation. For example, it can therefore be seen that the inlet chamber 36E extends along a linear path from the inlet port 32E to the diaphragm 264. The diaphragm 264 has a face 264A configured to seal the first valve controlled passage 259, the face 264A extending along a plane parallel with the inlet port 32E. The airing aperture 260 is oriented in a direction parallel to the inlet port 32E. The airing aperture 260 is oriented in a direction perpendicular to the outlet port 263.

During operation, the first O-ring 250 prevents flow communication between the expansion space 217 of the liquid fuel trap 202, and the outlet port 263 of the valve 20E, along a path external to the base housing portion 236.

Similarly, the second O-ring 258 prevents flow communication between the additional port 228 of the liquid fuel trap 202, and the outlet port 263 of the valve 20E, along a path external to the top housing portion 238 and central housing portion 26E.

Operation of the valve 20E disclosed in FIGS. 9A-9D is similar to that disclosed in connection with the previous examples.

Figure 10D:
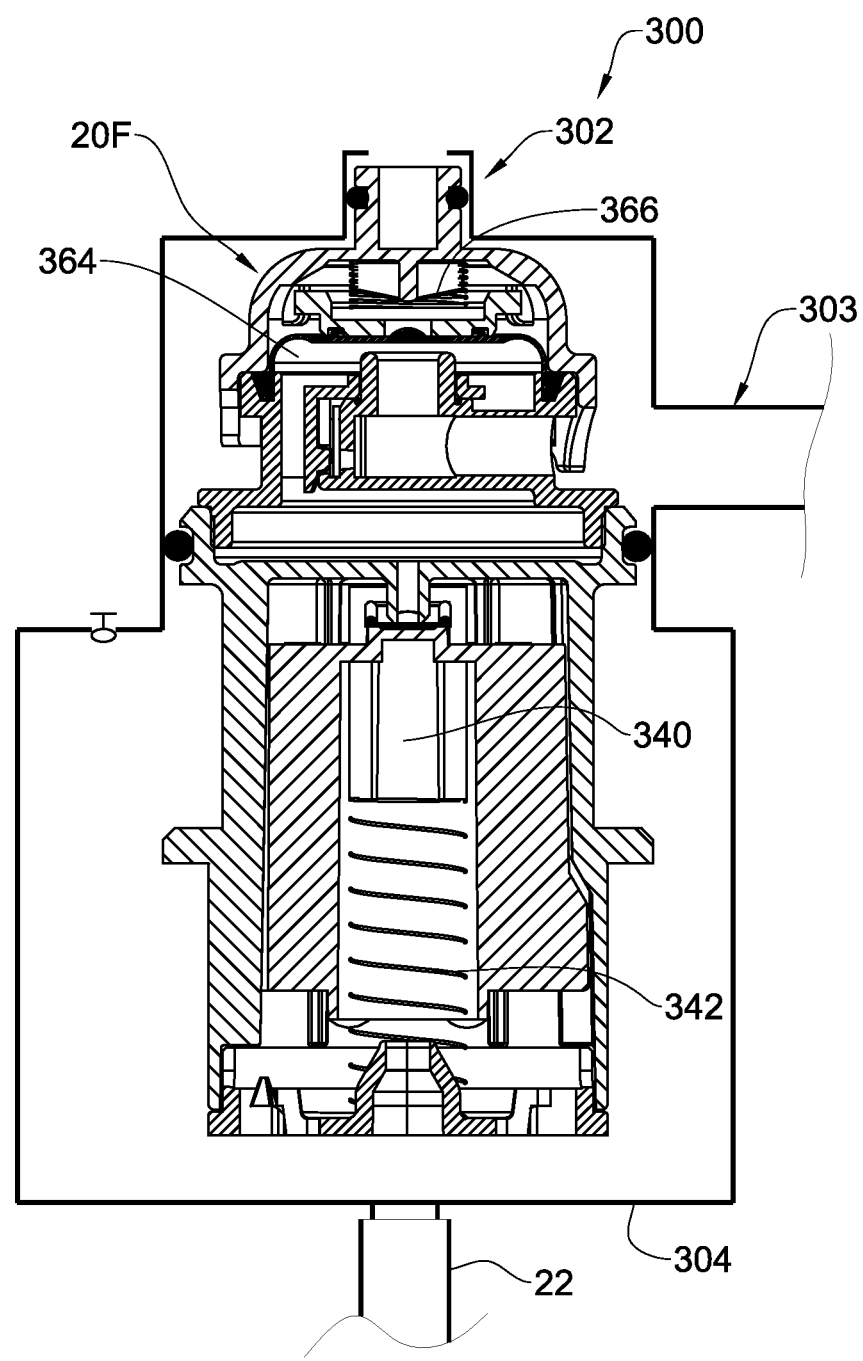
FIG. 10D is a schematic view of a liquid fuel trap with the valve in FIGS. 10A-10C, sectioned along line A-A in FIG. 10C, therein, and portions of a vapor recovery device and a pipe.

With reference to FIGS. 10A-10D, there is shown a valve generally designated 20F, which has a similar internal construction to the valve 20E shown in FIGS. 9A-9D. The valve 20F comprises a base housing portion 336, a top housing portion 338 and a central housing portion 26F extending therebetween. In FIG. 10D it can be seen that the valve 20F is part of a vehicle fuel system generally designated 300 which further includes a liquid fuel trap 302, a fuel vapor recovery device 303 (only partially shown) and a pipe 22 for connecting the liquid fuel trap 302 to a fuel tank 12 (not shown).

The present example is similar to the vehicle fuel system 200 in the previous example, except that:
the top portion 338 is substantially cylindrical and does not comprise a convex top portion;
the valve 20F also functions as a roll over valve (ROV) and therefore the base housing portion 336 further comprises ROV elements known in the art per se, such as a float 340 and associated spring 342 etc.

Operation of the valve 20F is similar to that disclosed in connection with the previous examples, with the additional function of the float 340 restricting flow through the central housing portion 26F when the valve rolls over. Notably, since the diaphragm 364 is normally biased shut via an associated spring 366, the float 340 essentially acts as a back-up shut off mechanism.

Whilst several examples have been shown and described in detail, it is to be understood that it is not intended thereby to limit the disclosure of the subject matter herein, but rather it is intended to cover all modifications and arrangements falling within the spirit and the scope of the subject matter herein, mutatis mutandis. For example, it should be realized that throughout the examples of the present subject matter herein, the second valve controlled passage may comprise more then one aperture.

The invention claimed is:

1. A fuel vapor control valve for use with a fuel tank, said valve comprising:
    a liquid fuel trap comprising a body formed with an expansion space and an entry port for allowing flow communication with the fuel tank;
    a fuel vapor control valve unit mounted inside the body of the a liquid fuel trap, the fuel vapor control valve unit comprising:
        a housing comprising a housing portion configured to fit into the body, the housing comprising an inlet port and an outlet port in flow communication via a first controlled valve passage and a second valve controlled valve passage, the first valve controlled passage being configured to admit fuel vapor flow in a direction from the inlet port to the outlet port only when pressure at the inlet port exceeds a predetermined threshold, the second valve controlled passage being configured to admit vapor flow in a direction from the outlet port to the inlet port only when pressure at the inlet port drops below pressure at the outlet port; and
    a sealing arrangement configured to provide a sealing arrangement between the outlet port of the fuel vapor control valve unit and the expansion space of the liquid fuel trap, the sealing arrangement comprising a peripheral seal located between an outer wall of the housing portion of the fuel vapor control valve unit and an inner wall of the body of the liquid fuel trap.

2. The fuel vapor control valve of claim 1, wherein the body comprises a section configured for receiving at least a portion of the housing of the fuel vapor control valve unit.

3. The fuel vapor control valve of claim 2, wherein the sealing arrangement further comprises a sealing element.

4. The fuel vapor control valve of claim 3, wherein the sealing element is an O-ring.

5. The fuel vapor control valve of claim 3, wherein the sealing element is a peripheral groove formed in the housing of the fuel vapor control valve.

6. The fuel vapor control valve of claim 1, wherein the fuel vapor control valve further comprises an inlet chamber associated with the inlet port, an outlet chamber associated with the outlet port, and a control chamber; the housing being formed with an airing aperture associated with the control chamber.

7. The fuel vapor control valve of claim 6, wherein the fuel vapor control valve further comprises at least one additional sealing arrangement.

8. The fuel vapor control valve of claim 7, wherein the at least one additional sealing arrangement is disposed at an external portion of the housing between the airing aperture and the inlet port.

9. The fuel vapor control valve of claim 7, wherein the at least one additional sealing arrangement is disposed at an external portion of the housing between the airing aperture and the outlet port.

10. The fuel vapor control valve of claim 1, being configured to prevent flow from the outlet port to the inlet port when pressure at the outlet port drops below pressure at the inlet port.

11. The fuel vapor control valve of claim 1, wherein the liquid fuel trap further comprises and an exit port and wherein the sealing arrangement is configured to prevent flow communication through an area disposed between the entry port and the exit port.

12. The fuel vapor control valve of claim 11, wherein said body comprises an expansion space being in flow communication with the entry port.

13. A fuel vapor control valve unit for use with a fuel tank, the fuel vapor control valve being configured to fit into a liquid fuel trap comprising a body formed with an expansion space and an entry port for flow communication with the fuel tank, the fuel vapor control valve unit comprising:
a housing comprising a cylindrical-shaped housing portion configured to fit into a cylindrical-shaped receiver of the body of the liquid fuel trap, the housing comprising an inlet port and an outlet port in flow communication via a first controlled valve passage and a second valve controlled valve passage, the first valve controlled passage being configured to admit fuel vapor flow in a direction from the inlet port to the outlet port only when pressure at the inlet port exceeds a predetermined threshold, the second valve controlled passage being configured to admit vapor flow in a direction from the outlet port to the inlet port only when pressure at the inlet port drops below pressure at the outlet port; and
a sealing arrangement configured to provide a sealing arrangement between the outlet port of the fuel vapor control valve unit and the entry port of the liquid fuel trap when the fuel vapor control valve unit is assembled together with the liquid fuel trap, the sealing arrangement comprising an O-ring seal disposed in an outer peripheral groove of the cylindrical-shaped housing portion, the O-ring seal configured to provide an outer peripheral seal between an outer wall of the cylindrical-shaped housing portion of the fuel vapor control valve unit and an inner wall of the receiver of the of the liquid fuel trap when the fuel vapor control valve unit is assembled to the liquid fuel trap.

14. A fuel vapor control valve for use with a fuel tank, the fuel vapor control valve being configured to fit into a liquid fuel trap comprising a body formed with an expansion space and an entry port for allowing flow communication with the fuel tank, the fuel vapor control valve unit comprising:
a housing, the housing comprising inlet and outlet ports in flow communication via first and second valve controlled passages, the first valve controlled passage being configured to admit fuel vapor flow in a direction from the inlet portion to the outlet port only when pressure at the inlet port exceeds a predetermined threshold, the second valve controlled passage being configured to admit vapor flow in a direction from the outlet port to the inlet port only when pressure at the inlet port drops below pressure at the outlet port, the fuel vapor control valve further comprising a sealing arrangement disposed about the housing between the inlet and outlet ports, and configured for sealing engagement between the housing and the body of liquid fuel trap, via direct contact with the body,
wherein the liquid fuel trap further comprises an exit port and wherein the sealing arrangement is configured to prevent flow communication through an area disposed between the entry port and the exit port of the liquid fuel trap, and
wherein the expansion space is in flow communication with the entry port of the liquid fuel trap.

15. A fuel vapor control valve for use with a fuel tank, comprising:
a liquid fuel trap comprising a body formed with an expansion space and an entry port for allowing flow communication with the fuel tank;
a fuel vapor control valve unit comprising:
a housing comprising a housing portion configured to fit within a receiver of the body of the liquid fuel trap when the fuel vapor control valve unit is assembled to the liquid fuel tramp, the housing comprising inlet and outlet ports in flow communication via first and second valve controlled passages, the first valve controlled passage being configured to admit fuel vapor flow in a direction from the inlet portion to the outlet port only when pressure at the inlet port exceeds a predetermined threshold, the second valve controlled passage being configured to admit vapor flow in a direction from the outlet port to the inlet port only when pressure at the inlet port drops below pressure at the outlet port; and
a sealing arrangement configured to provide a sealing arrangement between the outlet port of the fuel vapor control valve unit and the entry port of the fuel system component when the fuel vapor control valve unit is assembled together with the liquid fuel trap, the sealing arrangement comprising a peripheral sealing arrangement disposed about the housing portion located between the inlet and outlet ports, and configured for sealing engagement between the housing portion and receiver of the liquid fuel trap, via direct contact, when the fuel vapor control valve unit is assembled to the liquid fuel trap,
wherein the liquid fuel trap further comprises an exit port and wherein the sealing arrangement is configured to prevent flow communication through an area disposed between the entry port and the exit port of the liquid fuel trap.

* * * * *

UNITED STATES PATENT AND TRADEMARK OFFICE
CERTIFICATE OF CORRECTION

| | | |
|---|---|---|
| PATENT NO. | : 8,950,382 B2 | Page 1 of 1 |
| APPLICATION NO. | : 12/628488 | |
| DATED | : February 10, 2015 | |
| INVENTOR(S) | : Omer Vulkan et al. | |

It is certified that error appears in the above-identified patent and that said Letters Patent is hereby corrected as shown below:

In the Claims

Column 15, Claim 11, Line 28

Please delete "liquid fuel trap further comprises and an exit port and wherein"

and replace with -- liquid fuel trap further comprises an exit port and wherein --

Signed and Sealed this
Thirtieth Day of June, 2015

Michelle K. Lee
*Director of the United States Patent and Trademark Office*